United States Patent
Ramachandran et al.

(10) Patent No.: US 6,522,165 B2
(45) Date of Patent: Feb. 18, 2003

(54) BUS TERMINATION SCHEME FOR FLEXIBLE UNI-PROCESSOR AND DUAL PROCESSOR PLATFORMS

(75) Inventors: Vijayalakshmi Ramachandran, Hillsboro, OR (US); Usman Azeez Mughal, Hillsboro, OR (US); Chee How Lim, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/895,698

(22) Filed: Jun. 29, 2001

(65) Prior Publication Data

US 2003/0001610 A1 Jan. 2, 2003

(51) Int. Cl.[7] .............................................. H03K 17/16
(52) U.S. Cl. .............................. 326/30; 326/86; 326/90; 710/100
(58) Field of Search .............................. 326/30, 86, 90; 710/100; 333/4, 5, 12, 17.3, 22 R, 32, 100, 124

(56) References Cited

U.S. PATENT DOCUMENTS

| | | | |
|---|---|---|---|
| 5,490,279 | A | 2/1996 | Golbert et al. |
| 6,026,456 | A * | 5/2000 | Ilkbahar ..................... 710/101 |
| 6,122,695 | A * | 9/2000 | Cronin ....................... 710/126 |
| 6,204,683 | B1 | 3/2001 | Falconer |
| 6,218,863 | B1 | 4/2001 | Hsu et al. |
| 6,229,335 | B1 * | 5/2001 | Huang et al. ................ 326/30 |
| 6,232,814 | B1 | 5/2001 | Douglas, III |
| 6,249,142 | B1 | 6/2001 | Hall et al. |

OTHER PUBLICATIONS

100 MHz GTL + Layout Guidelines for the Pentium® II Processor and Intel 440BX AGPset, Intel Corporation, Application Note AP–827, 1997.
Slot 1 Bus Termination Card Design Guidelines, Intel Corporation, Aug. 1997.
Intel® 440BX AGPset Design Guide, Intel Corporation, Apr. 1998.
Intel 100MHz Pentium® II Processor/440GX AGPset Dual–Processor Customer Reference Schematics (Revision 1.0), Intel Corporation, Oct. 30, 1998.
100 MHz AGTL + Layout Guidelines for the Pentium® III Processor and Intel® 440BX AGPset, Intel Corporation, Application Note AP–906, Feb. 1999.
Intel® 440GX AGPset Design Guide, Intel Corporation, Mar. 1999.
SC242 Termination Card Design Guidelines, Intel Corporation, Nov. 1999.
Pentium® III Processor for the SC242 at 450 MHz to 1.13 GHz Datasheet, Intel Corporation, Jul. 2000.
Pentium® III Processor for the PGA370 Socket at 500 MHz to 1 GHz Datasheet, Intel Corporation, Oct. 2000.

* cited by examiner

Primary Examiner—Michael Tokar
Assistant Examiner—Vibol Tan
(74) Attorney, Agent, or Firm—Blakely, Sokoloff, Taylor & Zafman LLP

(57) ABSTRACT

A circuit board has a transmission line. A connector is coupled to the circuit board and electrically coupled to the transmission line. Bus termination circuitry is electrically coupled to the transmission line at or near an end of the transmission line at the connector such that the transmission line is terminated by the bus termination circuitry when the connector is not engaged to support any device for electrical coupling to the transmission line.

20 Claims, 6 Drawing Sheets

BUS TERMINATION SCHEME FOR FLEXIBLE UNI-PROCESSOR AND DUAL PROCESSOR PLATFORMS

BACKGROUND OF THE INVENTION

1. Field of the Invention

The present invention relates generally to the field of computer systems. More particularly, the present invention relates to the field of bus termination schemes.

2. Description of Related Art

Transmitting electrical signals over relatively long mismatched bus transmission lines between integrated circuit devices typically creates signal reflections. Signal reflections occur when only a portion of the power of a signal transmitted over a transmission line is output to the load at the end of the transmission line while the remaining portion of the power of the signal is reflected back onto the transmission line. The existence of signal reflections on transmission lines can result in overshoots, undershoots, and/or ringbacks, for example.

An overshoot typically occurs when the voltage of a received signal rises from a lower value, such as 0 Volts (V) for example, beyond a desired higher value, such as 3.3 Volts (V) for example, before settling near the higher value. An undershoot typically occurs when the voltage of a received signal falls from the higher value beyond the lower value before settling near the lower value. Ringbacks typically occur when a signal overshoot falls back below the higher value before settling near the higher value or when a signal undershoot rises back above the lower value before settling near the lower value.

Overshoots, undershoots, and ringbacks increase the amount of time required to read signals because the circuitry receiving each signal must wait relatively longer for the signal to settle near the higher or lower value prior to interpreting the signal as a logical one or zero, respectively. Because signals may be transmitted only as fast as they can be read, overshoots, undershoots, and ringbacks limit the frequency at which signals may be transmitted over a transmission line. Additionally, relatively large overshoots can damage circuitry designed to receive signals at voltage values of only some predetermined amount over the higher value.

To avoid or minimize signal reflections and therefore help maintain signal quality to allow signal transmission at relatively high frequencies, each transmission line may be terminated with a load having an impedance that is approximately equal to the characteristic impedance of the transmission line.

FIG. 1 illustrates a block diagram of a computer system 100 comprising a motherboard 102, a first processor card 110 supporting a first processor 112, a second processor card 120 supporting a second processor 122, and a chipset 130. Motherboard 102 has a processor bus formed by a plurality of transmission lines on motherboard 102. One exemplary transmission line 104 is illustrated in FIG. 1. Processor cards 110 and 120 are each mechanically and electrically coupled to the processor bus of motherboard 102 by insertion into a respective slot connector on motherboard 102. Chipset 130 is mechanically and electrically coupled to motherboard 102. At least one chip of chipset 130 is mechanically and electrically coupled to the processor bus of motherboard 102.

Processor 112 comprises on-die terminating pull-up resistors at or near the end of each transmission line at processor 112. Processor 122 comprises on-die terminating pull-up resistors at or near the end of each transmission line at processor 122. The terminating resistors each have an impedance approximately equal to the characteristic impedance of its corresponding transmission line to help avoid or minimize signal reflections at processors 112 and 122. As one example, processor 112 comprises an on-die terminating pull-up resistor 116 at or near its end of transmission line 104, and processor 122 comprises an on-die terminating resistor 126 at or near its end of transmission line 104.

The end of each transmission line at chipset 130 is not terminated with a resistor to help reduce design complexity and power dissipation that results from constant current flow through terminating resistors as a result of driving either end of each transmission line low. Because this single-ended termination scheme produces signal reflections at the end of each transmission line at chipset 130, the length of each stub for chipset 130, such as stub 134 for example, is relatively short to help minimize such signal reflections.

Computer system 100 may be changed to a uni-processor system by removing processor card 120, for example, from its slot connector on motherboard 102. Because the end of each transmission line at that slot connector would no longer have terminating resistors following removal of processor card 120, a bus termination card comprising terminating resistors for each such transmission line is typically inserted into the slot connector to avoid or minimize signal reflections. One or more resistors of a bus termination card, however, may not be firmly coupled to bus termination card and/or may become loose, for example, from rough handling by a user. As a result, one or more transmission lines may not be terminated by the bus termination card. A bus termination card also incurs an added expense for computer system 100.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description sets forth an embodiment or embodiments in accordance with the present invention for bus termination scheme for flexible uni-processor and dual processor platforms. In the following description, details are set forth such as specific circuitry, connectors, packaging technologies, etc. in order to provide a thorough understanding of the present invention. It will be evident, however, that the present invention may be practiced without these details. In other instances, well-known computer devices, etc. have not been described in particular detail so as not to obscure the present invention.

Exemplary Computer System

Figure 1:
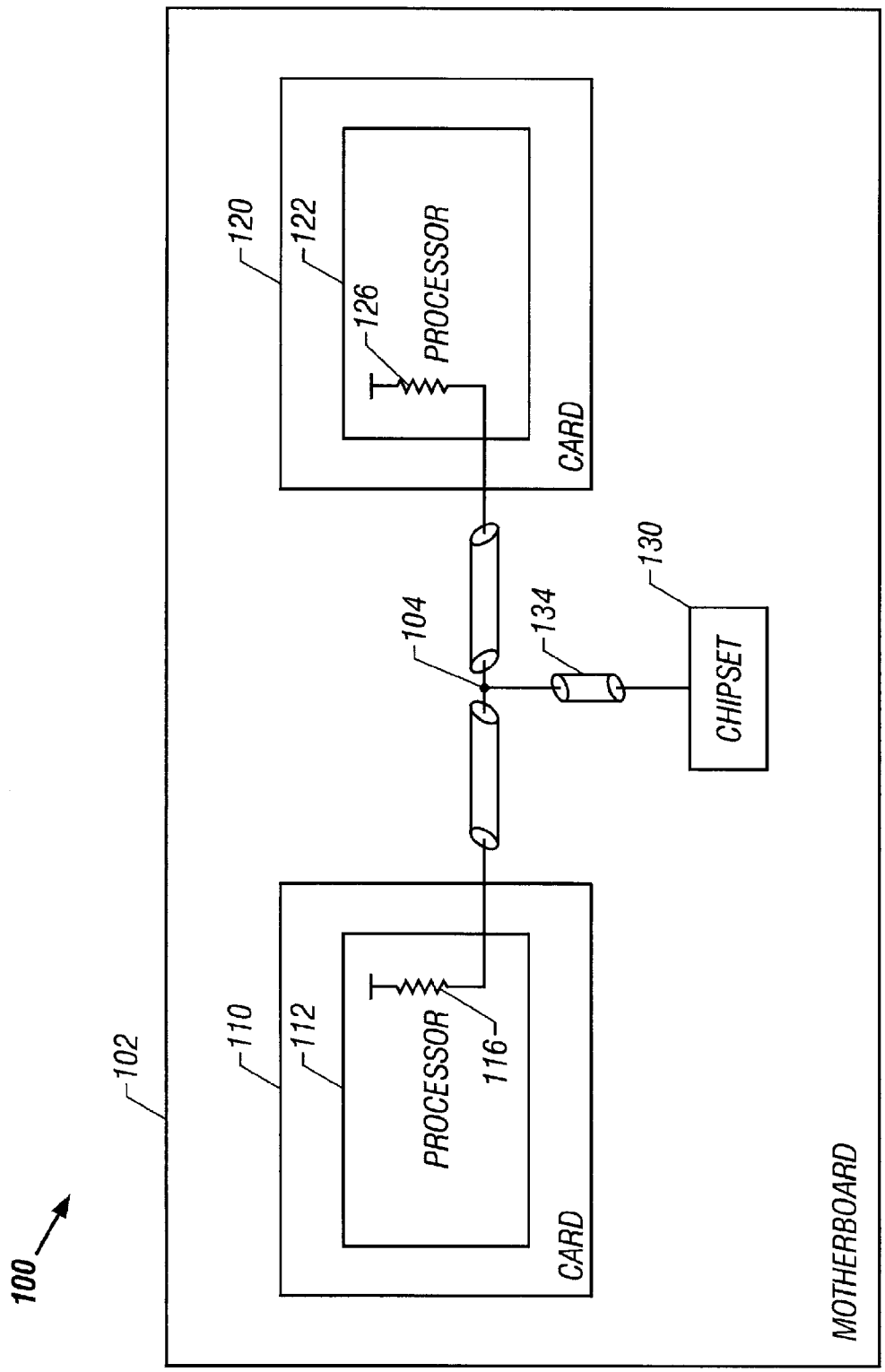
FIG. 1 illustrates a prior art computer system.
Figure 2:
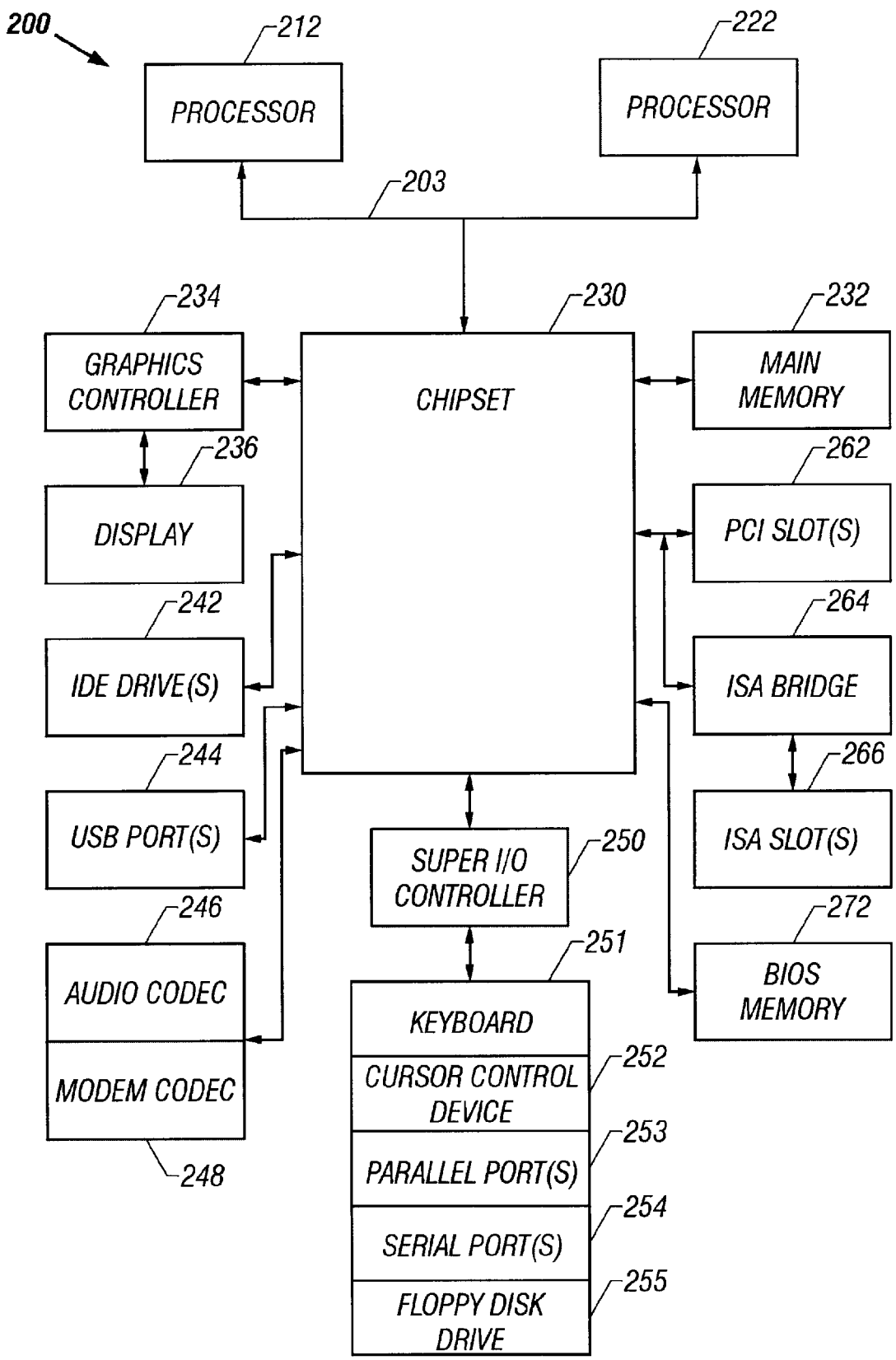
FIG. 2 illustrates, for one embodiment, an exemplary dual processor computer system.

FIG. 2 illustrates an exemplary dual processor computer system 200. Although described in the context of computer system 200, the present invention may be implemented in any suitable computer system comprising any suitable one or more integrated circuits.

As illustrated in FIG. 2, computer system 200 comprises processors 212 and 222, a processor bus 203, and a chipset 230. Processors 212 and 222 and chipset 230 are coupled to processor bus 203. Processors 212 and 222 may each comprise any suitable processor such as, for example, a processor in the Pentium® or Celeron™ family of processors available from Intel® Corporation of Santa Clara, Calif. For one embodiment, processor 222 is removably coupled to processor bus 203. In this manner, computer system 200 may optionally serve as a uni-processor computer system by not coupling or removing processor 222 from processor bus 203.

Chipset 230 provides an interface to processors 212 and 222 over processor bus 203 and to one or more suitable devices in communication with chipset 230. Chipset 230 may comprise any suitable interface controllers to provide for any suitable communication link to processor bus 203 and/or to any suitable device in communication with chipset 230. Chipset 230 for one embodiment provides suitable arbitration, buffering, and/or coherency management for each interface. Chipset 230 may comprise any suitable circuitry formed on any suitable one or more integrated circuit chips.

As illustrated in FIG. 2, chipset 230 for one embodiment provides an interface to a main memory 232 and a graphics controller 234 each coupled to chipset 230. Main memory 232 stores data and/or instructions, for example, for computer system 200 and may comprise any suitable memory, such as a dynamic random access memory (DRAM) for example. Graphics controller 234 controls the display of information on a suitable display 236, such as a cathode ray tube (CRT) or liquid crystal display (LCD) for example, coupled to graphics controller 234. Chipset 230 for one embodiment interfaces with graphics controller 234 through an accelerated graphics port (AGP). Graphics controller 234 for one embodiment may alternatively be included in chipset 230 as a separate chip or integrated with a suitable chip of chipset 230.

Also as illustrated in FIG. 2, chipset 230 for one embodiment provides an interface to one or more suitable integrated drive electronics (IDE) drives 242, such as a hard disk drive (HDD) or a compact disc read only memory (CD ROM) drive for example, to store data and/or instructions for example, one or more suitable universal serial bus (USB) devices through one or more USB ports 244, an audio coder/decoder (codec) 246, and a modem codec 248.

Chipset 230 for one embodiment also provides an interface through a super input/output (I/O) controller 250 to a keyboard 251, a cursor control device 252 such as a mouse or touchpad, for example, one or more suitable devices, such as a printer for example, through one or more parallel ports 253, one or more suitable devices through one or more serial ports 254, and a floppy disk drive 255.

Chipset 230 for one embodiment further provides an interface to one or more suitable peripheral component interconnect (PCI) devices coupled to chipset 230 through one or more PCI slots 262 on a PCI bus and an interface to one or more suitable industry standard architecture (ISA) devices coupled to chipset 230 by the PCI bus through an ISA bridge 264. ISA bridge 264 interfaces with one or more ISA devices through one or more ISA slots 266 on an ISA bus. ISA bridge 264 for one embodiment may alternatively be included in chipset 230 as a separate chip or integrated with a suitable chip of chipset 230.

Also as illustrated in FIG. 2, chipset 230 for one embodiment provides an interface to a basic input/output system (BIOS) memory 272 to store suitable system and/or video BIOS software for computer system 200. BIOS memory 272 for one embodiment may alternatively be included in chipset 230 as a separate chip or integrated with a suitable chip of chipset 230.

Figure 3:
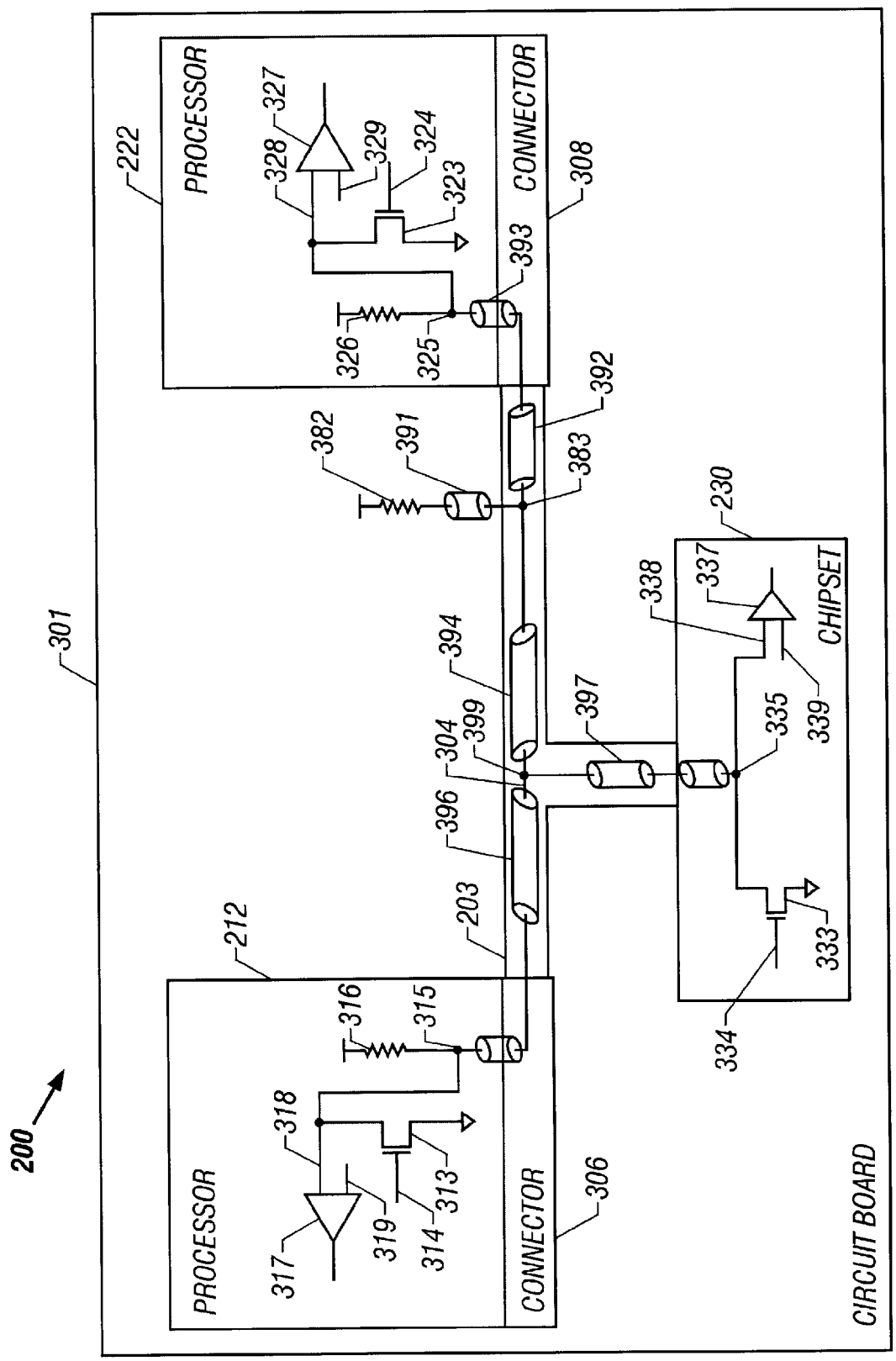
FIG. 3 illustrates, for one embodiment, a circuit board and connectors to help support the dual processor computer system of FIG. 2 and allow the computer system to be changed to a uni-processor computer system.

As illustrated in FIG. 3, computer system 200 for one embodiment comprises a circuit board 301. Circuit board 301 for one embodiment supports processor bus 203, processors 212 and 222, and chipset 230. Circuit board 301 may support processor bus 203, processors 212 and 222, and chipset 230 in any suitable manner.

Circuit board 301 for one embodiment supports each of a plurality of transmission lines, such as a transmission line 304 for example, forming processor bus 203 in one or more layers of circuit board 301. Processor bus 203 may comprise any suitable number of transmission lines.

Circuit board 301 for one embodiment supports processor 212 with a connector 306 and supports processor 222 with a connector 308. Each connector 306 and 308 is mechanically coupled or mounted to circuit board 301 such that connector 306 and 308, respectively, is electrically coupled to a plurality of the transmission lines of processor bus 203. Each connector 306 and 308 may be coupled to circuit board 301 in any suitable manner to electrically couple connector 306 and 308, respectively, to any suitable plurality of the transmission lines of processor bus 203.

Connector 306 may comprise any suitable connector to mechanically couple any suitable device having processor 212, such as a chip package or a card for example, to circuit board 301 in any suitable manner such that processor 212 is electrically coupled to a plurality of the transmission lines coupled to connector 306. Connector 308 may comprise any suitable connector to mechanically couple any suitable device having processor 222, such as a chip package or a card for example, to circuit board 301 in any suitable manner such that processor 222 is electrically coupled to a plurality of the transmission lines coupled to connector 308. Each processor 212 and 222 may be electrically coupled to any suitable plurality of the transmission lines coupled to connector 306 and 308, respectively. Connector 306 and/or 308 for one embodiment may each be used to removably couple processor 212 and/or 222, respectively, to circuit board 301. Connector 306 and 308 may each comprise the same type of connector or may each comprise a different connector.

Figure 4:
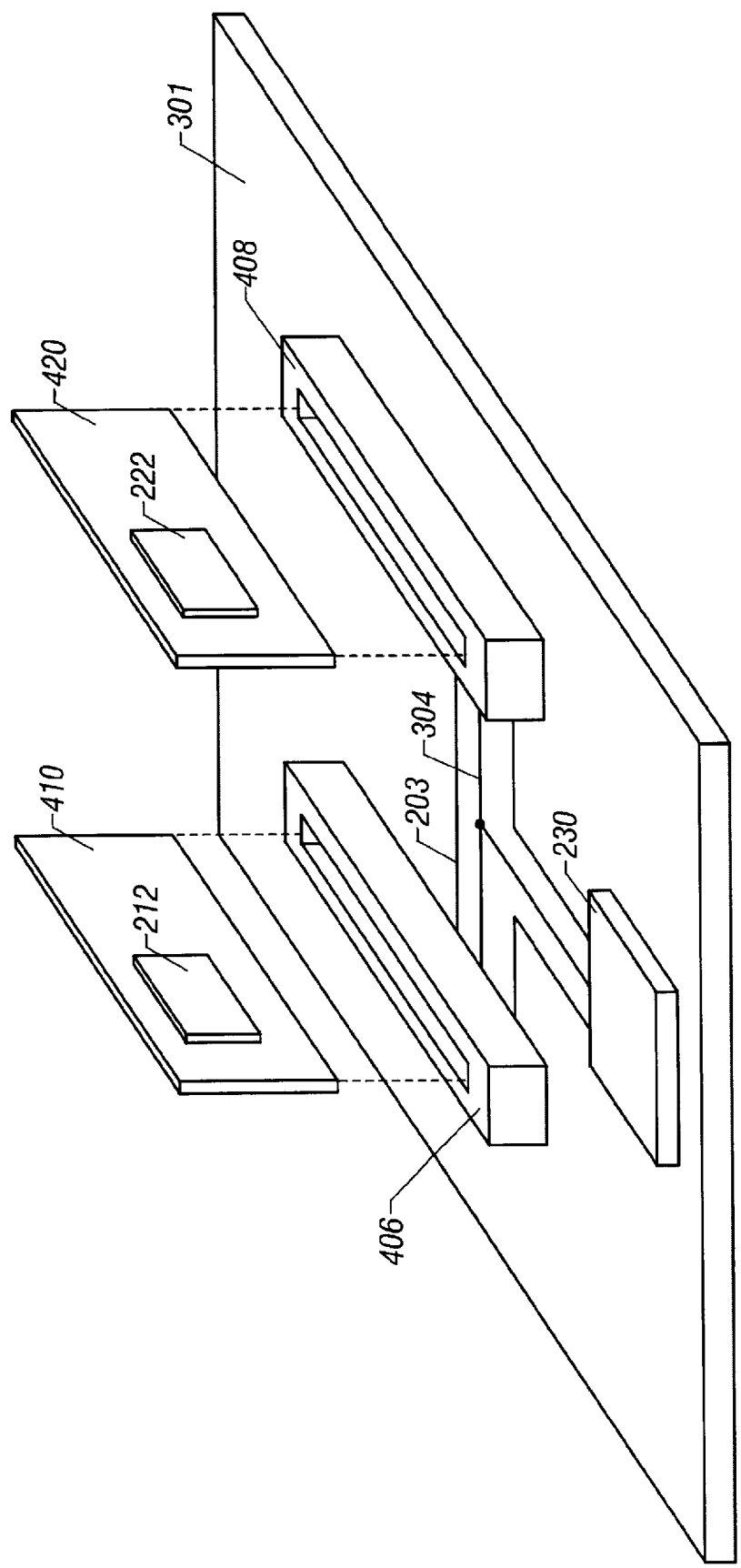
FIG. 4 illustrates, for one embodiment, a circuit board for the computer system of FIG. 2 with slot connectors each to receive a respective processor card.

Connector 306 and/or 308 for one embodiment each comprise a slot connector 406 and/or 408, respectively, as illustrated in FIG. 4.

Slot connector 406 defines a slot to receive an edge of a processor card 410 supporting processor 212. Processor 212 is mechanically and electrically coupled to processor card 410 such that processor 212 becomes electrically coupled to a plurality of the transmission lines coupled to slot connector 406 as processor card 410 is inserted into slot connector 406. Processor card 410 may be coupled to slot connector 406 in any suitable manner to couple processor 212 to processor bus 203 electrically.

Slot connector 408 defines a slot to receive an edge of a processor card 420 supporting processor 222. Processor 222 is mechanically and electrically coupled to processor card 420 such that processor 222 becomes electrically coupled to a plurality of the transmission lines coupled to slot connector 408 as processor card 420 is inserted into slot connector 408. Processor card 420 may be coupled to slot connector 408 in any suitable manner to couple processor 222 to processor bus 203 electrically.

Figure 5:
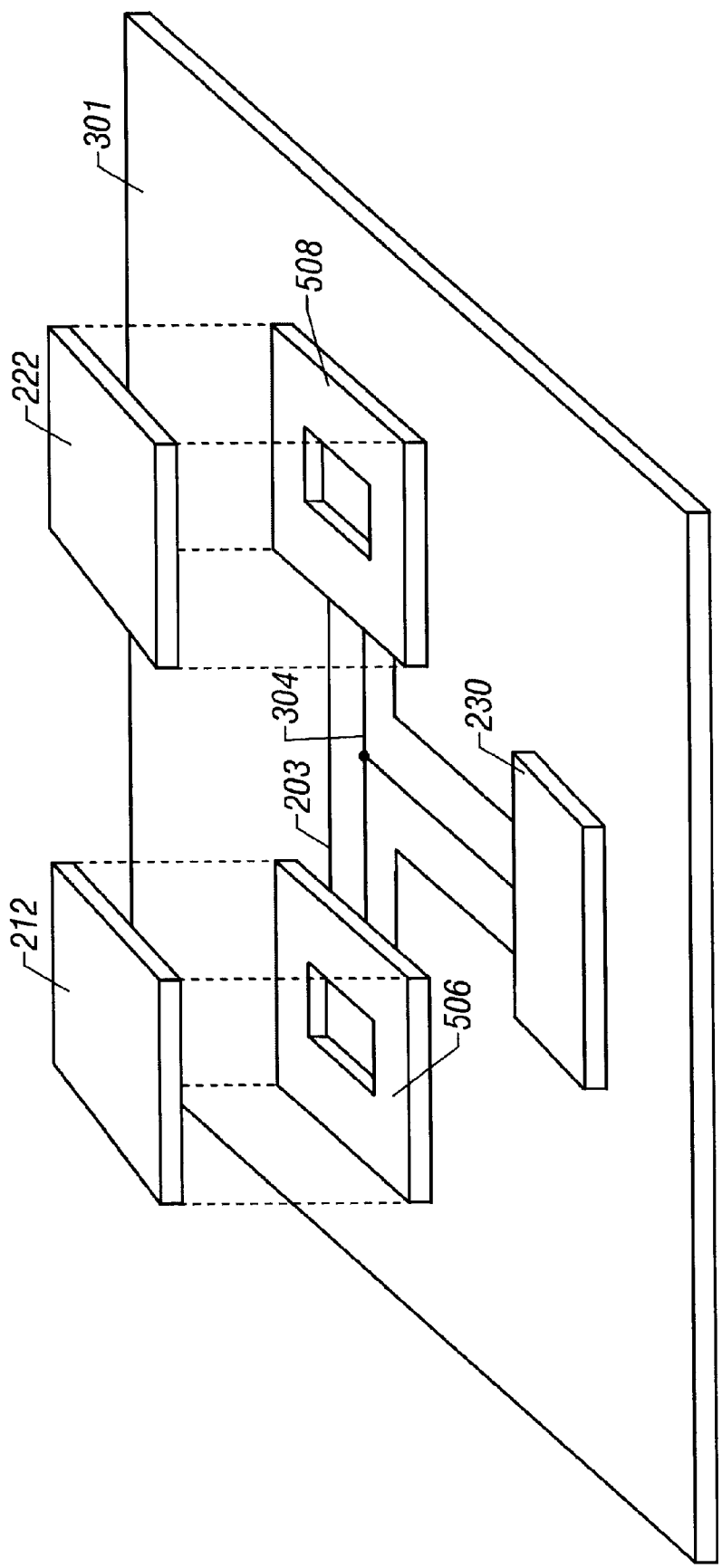
FIG. 5 illustrates, for one embodiment, a circuit board for the computer system of FIG. 2 with socket connectors each to receive a respective processor chip package.

Connector 306 and/or 308 for one embodiment each comprise a socket connector 506 and/or 508, respectively, as illustrated in FIG. 5.

Socket connector 506 receives a plurality of contacts, such as pins or balls for example, on a chip package supporting processor 212 to electrically couple processor 212 to a plurality of the transmission lines coupled to socket connector 506. Socket connector 508 receives a plurality of contacts, such as pins or balls for example, on a chip package supporting processor 222 to electrically couple processor 222 to a plurality of the transmission lines coupled to socket connector 508.

Connector 506 and/or 508 for one embodiment may each comprise a suitable pin grid array (PGA) socket, such as a flip chip pin grid array (FC-PGA) socket or a micro-PGA socket. Processor 212 and/or 222 for one embodiment may each be packaged using a suitable PGA package technology, such as a flip chip pin grid array (FC-PGA) or plastic pin grid array (PPGA) technology for example. Connector 506 and/or 508 for one embodiment may each comprise a suitable Zero Insertion Force (ZIF) socket to allow respective processor 212 and/or 222 to be inserted into and removed from connector 506 and/or 508 with relative ease.

Circuit board 301 for one embodiment also supports chipset 230. Each chip of chipset 230 may be mechanically coupled to circuit board 301 in any suitable manner such that at least one chip of chipset 230 is electrically coupled to a plurality of the transmission lines of processor bus 203. Chipset 230 may be electrically coupled to any suitable plurality of the transmission lines of processor bus 203.

For one embodiment, one or more chips of chipset 230 may each be inserted into a respective suitable socket mechanically coupled or mounted to circuit board 301 such that at least one such socket is electrically coupled to a plurality of the transmission lines of processor bus 203. For another embodiment, one or more chips of chipset 230 may be coupled to a suitable card inserted into a suitable slot connector mechanically coupled to circuit board 301 such that the slot connector is electrically coupled to a plurality of the transmission lines of processor bus 203.

Circuit board 301 for one embodiment may also support any other suitable device of computer system 200 or any suitable connector for any other suitable device of computer system 200 in any suitable manner.

Each processor 212 and 222 for one embodiment has input/output (I/O) circuitry and/or bus termination circuitry electrically coupled at or near the end of each of a plurality of transmission lines of processor bus 203 at processor 212 and 222, respectively. Each processor 212 and 222 may have I/O circuitry to transmit and/or receive signals over each of a plurality of transmission lines of processor bus 203 at processor 212 and 222, respectively. Each processor 212 and 222 may have bus termination circuitry to help avoid or minimize signal reflections at the end of each of a plurality of transmission lines of processor bus 203 at processor 212 and 222, respectively. Processors 212 and 222 may each have any suitable I/O circuitry and/or bus termination circuitry electrically coupled to each of any suitable plurality of transmission lines.

FIG. 3 illustrates, for one embodiment, input/output (I/O) circuitry and bus termination circuitry electrically coupled to transmission line 304 of processor bus 203 for each processor 212 and 222.

For one embodiment, as illustrated in FIG. 3, processor 212 has an n-channel metal oxide semiconductor field effect transistor (N-MOSFET) 313 having a source terminal coupled to a relatively low power supply node, such as ground for example, and a drain terminal coupled to a node 315 at or near an end of transmission line 304. Processor 212 also has a resistor 316 coupled between a relatively high power supply node and node 315 to serve as a pull-up resistor. Processor 212 drives or transmits signals onto transmission line 304 by applying suitable high and low voltage signals to a gate terminal 314 of transistor 313 to turn transistor 313 on and off. When processor 212 turns transistor 313 off, the voltage at node 315 is pulled up by the high power supply node coupled to resistor 316, thereby driving a relatively high voltage signal onto transmission line 304. When processor 212 turns transistor 313 on, the voltage at node 315 is pulled down by the low power supply node coupled to transistor 313, thereby driving a relatively low voltage signal onto transmission line 304.

Processor 212 also has a differential amplifier 317 having one input terminal 318 coupled to node 315 of transmission line 304 and another input terminal 319 coupled to a suitable reference voltage node. By comparing the voltage of signals received over transmission line 304 to a reference voltage at the reference voltage node, differential amplifier 317 interprets each received signal as a logical one if the voltage of the signal is above the reference voltage and as a logical zero if the voltage of the signal is below the reference voltage.

Resistor 316 also serves to terminate transmission line 304 at processor 212. Resistor 316 may have any suitable resistance to help avoid or minimize signal reflections caused by receiving signals at the end of transmission line 304 at processor 212. Resistor 316 may be implemented using any suitable device or component.

Processor 222, for one embodiment, has an n-channel metal oxide semiconductor field effect transistor (N-MOSFET) 323 having a source terminal coupled to a relatively low power supply node, such as ground for example, and a drain terminal coupled to a node 325 at or near an end of transmission line 304. Processor 222 also has a resistor 326 coupled between a relatively high power supply node and node 325 to serve as a pull-up resistor. Processor 222 drives or transmits signals onto transmission line 304 by applying suitable high and low voltage signals to a gate terminal 324 of transistor 323 to turn transistor 323 on and off. When processor 222 turns transistor 323 off, the voltage at node 325 is pulled up by the high power supply node coupled to resistor 326, thereby driving a relatively high voltage signal onto transmission line 304. When processor 222 turns transistor 323 on, the voltage at node 325 is pulled down by the low power supply node coupled to transistor 323, thereby driving a relatively low voltage signal onto transmission line 304.

Processor 222 also has a differential amplifier 327 having one input terminal 328 coupled to node 325 of transmission line 304 and another input terminal 329 coupled to a suitable reference voltage node. By comparing the voltage of signals received over transmission line 304 to a reference voltage at the reference voltage node, differential amplifier 327 interprets each received signal as a logical one if the voltage of the signal is above the reference voltage and as a logical zero if the voltage of the signal is below the reference voltage.

Resistor 326 also serves to terminate transmission line 304 at processor 222. Resistor 316 may have any suitable resistance to help avoid or minimize signal reflections caused by receiving signals at the end of transmission line 304 at processor 222. Resistor 326 may be implemented using any suitable device or component.

Although illustrated as having I/O circuitry and bus termination circuitry electrically coupled to only one transmission line 304 of processor bus 203, each processor 212 and 222 may have I/O circuitry and/or bus termination circuitry electrically coupled to each of any suitable one or more transmission lines of processor bus 203 at processor 212 and 222, respectively. Processor 212 and/or 222 for one embodiment each have I/O circuitry and/or bus termination circuitry for each of a plurality of address lines of processor bus 203. Processor 212 and/or 222 for one embodiment each have I/O circuitry and/or bus termination circuitry for each of a plurality of data lines of processor bus 203. Processor 212 and/or 222 for one embodiment each have I/O circuitry and/or bus termination circuitry for each of a plurality of control lines of processor bus 203. Processor 212 and/or 222 for one embodiment each have I/O circuitry and/or bus termination circuitry electrically coupled to each of all of the transmission lines of processor bus 203 at processor 212 and/or 222, respectively.

Each processor 212 and/or 222 may have only I/O circuitry to transmit signals over each of one or more transmission lines of processor bus 203, only I/O circuitry to receive signals over each of one or more transmission lines of processor bus 203, and/or I/O circuitry to both transmit and receive signals over each of one or more transmission lines. Each processor 212 and/or 222 may have bus termination circuitry at any suitable one or more transmission lines of processor bus 203 at processor 212 and/or processor 222, respectively.

Processor 212 may have the same or different I/O circuitry to transmit signals for each transmission line at which processor 212 has such I/O circuitry. Processor 212 may have the same or different I/O circuitry to receive signals for each transmission line at which processor 212 has such I/O circuitry. Processor 212 may have the same or different bus termination circuitry for each transmission line at which processor 212 has bus termination circuitry.

Processor 222 may have the same or different I/O circuitry to transmit signals for each transmission line at which processor 222 has such I/O circuitry. Processor 222 may have the same or different I/O circuitry to receive signals for each transmission line at which processor 222 has such I/O circuitry. Processor 222 may have the same or different bus termination circuitry for each transmission line at which processor 222 has bus termination circuitry.

The I/O circuitry and/or bus termination circuitry for processor 212 and/or 222 may be formed at any suitable location on any suitable device supporting processor 212 and/or 222, respectively. For one embodiment, the I/O circuitry and/or bus termination circuitry for processor 212 and/or 222 are formed on-die with processor 212 and/or 222, respectively. For another embodiment, the bus termination circuitry is formed in the package for processor 212 and/or 222 between the processor die and one or more external contacts, such as pins or balls for example. For another embodiment where processor 212 and/or 222 are supported by processor card 410 and/or 420, respectively, as illustrated in FIG. 4, bus termination circuitry may be formed on processor card 410 and/or 420, respectively, external to processor 212 and/or 222, respectively.

Figure 6:
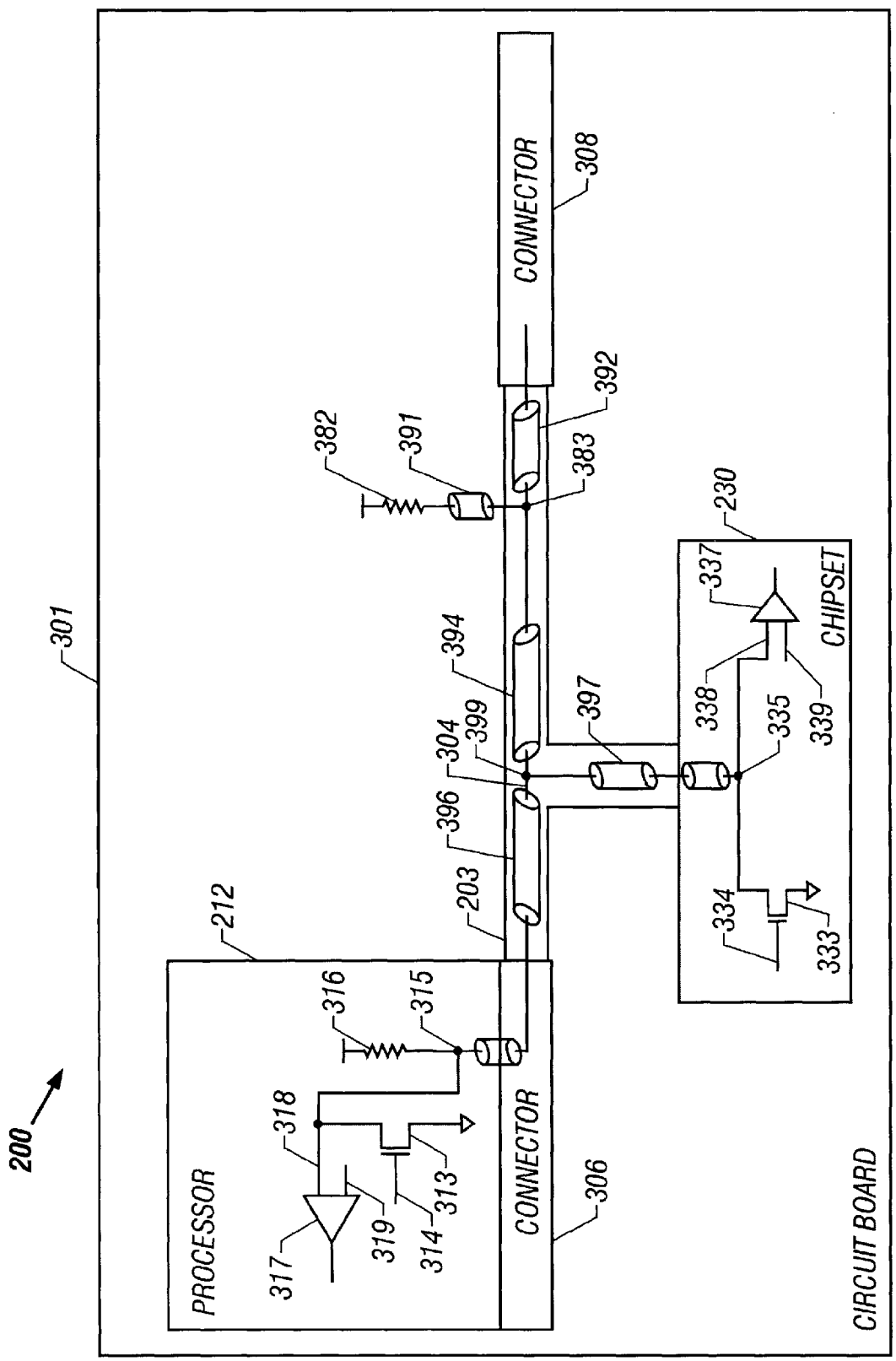
FIG. 6 illustrates, for one embodiment, the circuit board and connectors of FIG. 3 supporting a uni-processor computer system.

Computer system 200 comprises bus termination circuitry electrically coupled to one or more transmission lines at or near the end of each such transmission line at connector 308 such that the transmission line is terminated by the bus termination circuitry when connector 308 is not engaged to support or occupied by any device, such as processor 222 or a bus termination device for example. Computer system 200 may then optionally serve as a single processor or uni-processor computer system, as illustrated in FIG. 6, by not coupling processor 222 to connector 308 or by removing processor 222 from connector 308 without any need for coupling of any other device, such as a bus termination device for example, to connector 308 to avoid or minimize signal reflections at connector 308. In this manner, the expense and risk of loose terminating resistors associated with use of typical bus termination cards may be avoided.

Computer system 200 may comprise any suitable bus termination circuitry to allow computer system 200 to optionally serve as either a uni-processor or dual processor computer system with no or minimized signal reflections on one or more transmission lines of processor bus 203.

As illustrated in FIGS. 3 and 6, such bus termination circuitry for one embodiment comprises a resistor 382 coupled between a node 383 at or near the end of transmission line 304 at connector 308 and a relatively high power supply node to serve as a pull-up resistor. Resistor 382 may have any suitable resistance to help avoid or minimize signal reflections caused by receiving signals at the end of transmission line 304 at connector 308 when connector 308 is not engaged to support or occupied by any device, such as processor 222 or a bus termination device for example. Resistor 382 may be implemented using any suitable device or component.

As processor 222 is to be coupled to processor bus 203 with connector 308 when computer system 200 is to serve as a dual processor computer system, the value of the resistance to be used for resistor 382 depends on the bus termination circuitry coupled to processor bus 203 when processor 222 is coupled to processor bus 203. For one embodiment where processor 222 has bus termination circuitry comprising resistor 326, as illustrated in FIG. 3, transmission line 304 is then terminated with an effective resistance from the parallel combination of resistor 382 and resistor 326.

The resistance used for each resistor 382 and resistor 326 may depend, for example, on the desired signal timing and/or signal quality for signal transmissions over transmission line 304 when computer system 200 is to serve as a uni-processor computer system and when computer system 200 is to serve as a dual processor computer system. As one example, the resistance used for resistors 326 and 382 may be selected to optimize signal timing and/or signal quality for signal transmissions over transmission line 304 when computer system 200 is to serve as a uni-processor computer system while satisfying one or more signal timing and/or signal quality constraints when computer system 200 is to serve as a dual processor computer system.

The resistance used for each resistor 382 and resistor 326 may also depend, for example, on the characteristic impedance of transmission line 304, the trace length of a stub 391 between resistor 382 and node 383, the trace length of a stub 392 between node 383 and connector 308, and the trace length of a stub 393 between connector 308 and node 325. For one embodiment, the effective resistance from the parallel combination of resistor 382 and resistor 326 is generally close to the characteristic impedance of transmission line 304.

For one embodiment, transmission line 304 has a characteristic impedance of approximately 60 ohms; the trace length of stub 391 is less than or equal to approximately one-half inch; processor 222 is less than or equal to approximately one-half inch from node 383 through connector 308 and along stub 392; processor 222 is less than or equal to approximately 3.5 inches from a node 399 through connector 308, along stub 392, and along a stub 394 between node 383 and node 399; processor 212 is less than or equal to approximately 3.5 inches from node 399 through connector 306 and along a stub 396 between connector 306 and node 399; and the trace length of a stub 397 between chipset 230 and node 399 is less than or equal to approximately 2 inches. Resistor 382 for one embodiment may then have a resistance in the range of approximately 110 to approximately 130 ohms, for example; resistor 326 for one embodiment may then have a resistance of approximately 100 ohms, for example; and resistor 316 of processor 212 may then have a resistance of approximately 60 ohms, for example.

For one embodiment where each processor 212 and 222 comprises on-die bus termination circuitry, each processor 212 and 222 may comprise suitable circuitry to set the resistance of such bus termination circuitry selectively. In this manner, any processor 212 or 222 may be coupled to circuit board 301 using either connector 306 or 308. Processor 212 and/or 222 may then selectively set its on-die resistance depending on which connector 306 or 308 processor 212 and/or 222 uses.

Although illustrated as having bus termination circuitry electrically coupled to only one transmission line 304 of processor bus 203, computer system 200 may have bus termination circuitry electrically coupled to each of any suitable one or more transmission lines of processor bus 203 at connector 308. Computer system 200 for one embodiment has bus termination circuitry for each of a plurality of address lines of processor bus 203. Computer system 200 for one embodiment has bus termination circuitry for each of a plurality of data lines of processor bus 203. Computer system 200 for one embodiment has bus termination circuitry for each of a plurality of control lines of processor bus 203. Computer system 200 for one embodiment has bus termination circuitry for each transmission line that would be terminated by bus termination circuitry for processor 222 if processor 222 were coupled to processor bus 203 with connector 308. Computer system 200 for one embodiment has bus termination circuitry electrically coupled to each of all of the transmission lines of processor bus 203 at connector 308. Computer system 200 may have the same or different bus termination circuitry for each transmission line at which computer system 200 has bus termination circuitry at connector 308.

Suitable bus termination circuitry for one embodiment may be mechanically coupled to or mounted directly to circuit board 301 at or near where each of one or more transmission lines is coupled to connector 308 such that the bus termination circuitry is electrically coupled to each such transmission line at or near the end of each such transmission line at connector 308. Suitable bus termination circuitry for one embodiment may be mechanically coupled to or mounted directly to the same surface of circuit board 301 on which connector 308 is coupled or mounted and/or to the opposite surface of circuit board 301 for mechanical and electrical coupling to one or more transmission lines at or near connector 308 through circuit board 301. Suitable bus termination circuitry for one embodiment may be mounted to or supported by connector 308 such that the bus termination circuitry is electrically coupled to each of one or more transmission lines at or near the end of each such transmission line at connector 308 when connector 308 is coupled to circuit board 301.

Although described as comprising resistor 382 that serves as a pull-up resistor, computer system 200 may comprise other suitable bus termination circuitry, such as a resistor coupled in series or a pull-down resistor for example, at or near the end of any suitable one or more transmission lines at connector 308. The bus termination circuitry used may depend, for example, on the I/O circuitry used by processors 212 and 222 and chipset 230 to transmit and receive signals over each such transmission line.

Although described as comprising bus termination circuitry at or near the end of each of one or more transmission lines at only one connector 308, computer system 200 for another embodiment may also comprise bus termination circuitry at or near the end of each of one or more transmission lines at connector 306. In this manner, computer system 200 may serve as a uni-processor computer system using either processor 212 or processor 222 without any need for coupling of any device, such as a bus termination device for example, to connector 308 or 306, respectively, to avoid or minimize signal reflections at connector 308 or 306, respectively. This option may be desired, for example, where connectors 306 and 308 are different. Computer system 200 may comprise any suitable bus termination circuitry, such as a pull-up resistor for example, at or near the end of each of any suitable one or more transmission lines at connector 306.

Chipset 230 for one embodiment has input/output (I/O) circuitry electrically coupled at or near the end of each of a plurality of transmission lines of processor bus 203 at chipset 230. Chipset 230 may have I/O circuitry to transmit and/or receive signals over each of a plurality of transmission lines of processor bus 203 at chipset 230. Chipset 230 may have any suitable I/O circuitry electrically coupled to each of any suitable plurality of transmission lines.

Chipset 230, for one embodiment, has an n-channel metal oxide semiconductor field effect transistor (N-MOSFET) 333 having a source terminal coupled to a relatively low power supply node, such as ground for example, and a drain terminal coupled to a node 335 at an end of transmission line 304. Chipset 230 drives or transmits signals onto transmission line 304 by applying suitable high and low voltage signals to a gate terminal 334 of transistor 333 to turn transistor 333 on and off. When chipset 230 turns transistor 333 off, the voltage at node 335 is pulled up by the high power supply node coupled to resistor 316, resistor 382, and resistor 326 when processor 222 is coupled to transmission line 304, thereby driving a relatively high voltage signal onto transmission line 304. When chipset 230 turns transistor 333 on, the voltage at node 335 is pulled down by the low power supply node coupled to transistor 333, thereby driving a relatively low voltage signal onto transmission line 304.

Chipset 230 also has a differential amplifier 337 having one input terminal 338 coupled to transmission line 304 and another input terminal 339 coupled to a suitable reference voltage node. By comparing the voltage of signals received over transmission line 304 to the reference voltage at the reference voltage node, differential amplifier 337 interprets each received signal as a logical one if the voltage of the signal is above the reference voltage and as a logical zero if the voltage of the signal is below the reference voltage.

For one embodiment, the end of one or more transmission lines of processor bus 203 at chipset 230 is not terminated with a resistor to help reduce design complexity and power dissipation that results from constant current flow through terminating resistors as a result of driving any end of a transmission line low. Because this single-ended termination scheme produces signal reflections at the end of each such transmission line at chipset 230, the trace length of each stub for chipset 230, such as a stub 397 between chipset 230 and node 399 for example, is relatively short to help minimize such signal reflections.

Chipset 230 for one embodiment may have bus termination circuitry electrically coupled at or near the end of each of one or more transmission lines of processor bus 203 at chipset 230 to help avoid or minimize signal reflections at the end of each such transmission line at chipset 230. Chipset 230 may have any suitable bus termination circuitry at or near the end of any suitable one or more transmission lines of processor bus 203 at chipset 230.

Although described in the context of computer system 200 where processor 222 may be either coupled to or removed from connector 308, the present invention may be used to couple or remove any suitable device from any suitable connector in any suitable computer system with minimized concern for signal reflections at the connector.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. An apparatus comprising:
    a circuit board having a transmission line;
    a connector coupled to the circuit board, the connector electrically coupled to the transmission line; and
    first bus termination circuitry electrically coupled to the transmission line at or near an end of the transmission line at the connector to terminate the transmission line when the connector is not engaged to support any device for electrical coupling to the transmission line;
    the first bus termination circuitry and a second bus termination circuitry on a device to terminate the transmission line when the connector is engaged to support the device for electrical coupling to the transmission line.

2. The apparatus of claim 1, wherein the bus termination circuitry comprises a resistor.

3. The apparatus of claim 1, wherein the connector comprises the bus termination circuitry.

4. The apparatus of claim 1, wherein the bus termination circuitry is mounted directly to the circuit board.

5. The apparatus of claim 1, wherein the connector comprises a slot connector to receive a card.

6. The apparatus of claim 1, wherein the connector comprises a socket connector to receive a chip.

7. A computer system comprising:
    a circuit board having a transmission line;
    a processor supported by the circuit board and electrically coupled to the transmission line;
    a connector coupled to the circuit board, the connector electrically coupled to the transmission line; and
    first bus termination circuitry electrically coupled to the transmission line at or near an end of the transmission line at the connector to terminate the transmission line when the connector is not engaged to support any device for electrical coupling to the transmission line;
    the first bus termination circuitry and a second bus termination circuitry on a device to terminate the transmission line when the connector is engaged to support the device for electrical coupling to the transmission line.

8. The computer system of claim 7, wherein the bus termination circuitry comprises a resistor.

9. The computer system of claim 7, wherein the connector comprises the bus termination circuitry.

10. The computer system of claim 7, wherein the bus termination circuitry is mounted directly to the circuit board.

11. The computer system of claim 7, wherein the connector comprises a slot connector to receive a processor card.

12. The computer system of claim 7, wherein the connector comprises a socket connector to receive a processor chip.

13. The computer system of claim 7, comprising a chipset coupled to the circuit board and electrically coupled to the transmission line.

14. An apparatus comprising:
    a circuit board having a transmission line;
    a device having first bus termination circuitry;
    a connector coupled to the circuit board, the connector to electrically couple the device to the transmission line; and
    second bus termination circuitry electrically coupled to the transmission line at or near an end of the transmission line at the connector;
    the first bus termination circuitry and the second bus termination circuitry to terminate the transmission line when the connector is engaged to support the device, and
    the second bus termination circuitry to terminate the transmission line when the connector is not engaged to support the device.

15. The apparatus of claim 14, wherein the first bus termination circuitry comprises a resistor.

16. The apparatus of claim 14, wherein the second bus termination circuitry comprises a resistor.

17. The apparatus of claim 14, wherein the connector comprises the second bus termination circuitry.

18. The apparatus of claim 14, wherein the second bus termination circuitry is mounted directly to the circuit board.

19. The apparatus of claim 14, wherein the device comprises a card and the connector comprises a slot connector to receive the card.

20. The apparatus of claim 14, wherein the device comprises a chip and the connector comprises a socket connector to receive the chip.

* * * * *